US008209405B1

(12) United States Patent
Trivedi

(10) Patent No.: US 8,209,405 B1
(45) Date of Patent: Jun. 26, 2012

(54) FAILOVER SCHEME WITH SERVICE-BASED SEGREGATION

(75) Inventor: Atul Narendra Trivedi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1587 days.

(21) Appl. No.: 11/423,566

(22) Filed: Jun. 12, 2006

(51) Int. Cl.
*G06F 15/173* (2006.01)
*G06F 9/46* (2006.01)

(52) U.S. Cl. ......... 709/223; 709/226; 718/104; 718/105
(58) Field of Classification Search .................. 709/223; 714/26
See application file for complete search history.

(56) References Cited

U.S. PATENT DOCUMENTS

| | | | | |
|---|---|---|---|---|
| 5,473,599 | A | 12/1995 | Li et al. ........................... 370/16 |
| 6,393,386 | B1 * | 5/2002 | Zager et al. ..................... 703/25 |
| 6,401,120 | B1 * | 6/2002 | Gamache et al. ............. 709/226 |
| 6,415,323 | B1 * | 7/2002 | McCanne et al. ............. 709/225 |
| 6,449,734 | B1 * | 9/2002 | Shrivastava et al. ........... 714/15 |
| 6,578,160 | B1 * | 6/2003 | MacHardy et al. ............. 714/43 |
| 6,748,437 | B1 * | 6/2004 | Mankude et al. ............. 709/227 |
| 6,748,447 | B1 * | 6/2004 | Basani et al. .................. 709/244 |
| 6,826,606 | B2 * | 11/2004 | Freeman et al. ............... 709/223 |
| 6,876,625 | B1 * | 4/2005 | McAllister et al. ........... 370/221 |
| 6,957,254 | B1 * | 10/2005 | Iterum et al. .................. 709/221 |
| 6,971,044 | B2 * | 11/2005 | Geng et al. ..................... 714/11 |
| 7,020,701 | B1 * | 3/2006 | Gelvin et al. .................. 709/224 |
| 7,047,287 | B2 * | 5/2006 | Sim et al. ....................... 709/221 |
| 7,065,579 | B2 * | 6/2006 | Traversat et al. ............. 709/230 |
| 7,181,523 | B2 * | 2/2007 | Sim ................................ 709/226 |
| 7,231,430 | B2 * | 6/2007 | Brownell et al. .............. 709/218 |
| 7,275,102 | B2 * | 9/2007 | Yeager et al. .................. 709/224 |
| 7,287,180 | B1 * | 10/2007 | Chen et al. ........................ 714/4 |
| 7,299,294 | B1 * | 11/2007 | Bruck et al. ................... 709/235 |
| 7,305,492 | B2 * | 12/2007 | Bryers et al. .................. 709/249 |
| 7,315,903 | B1 * | 1/2008 | Bowden ......................... 709/250 |
| 7,392,421 | B1 * | 6/2008 | Bloomstein et al. .............. 714/4 |
| 7,401,152 | B2 * | 7/2008 | Traversat et al. ............. 709/230 |
| 7,457,236 | B2 * | 11/2008 | Cheng et al. ................... 370/220 |
| 7,529,822 | B2 * | 5/2009 | Joshi et al. .................... 709/223 |
| 7,587,465 | B1 * | 9/2009 | Muchow ....................... 709/209 |
| 7,711,820 | B2 * | 5/2010 | Sharma et al. ................ 709/226 |
| 7,788,522 | B1 * | 8/2010 | Abdelaziz et al. ............ 714/4.1 |
| 7,900,206 | B1 * | 3/2011 | Joshi et al. .................... 718/104 |
| 2003/0009540 | A1 * | 1/2003 | Benfield et al. ............... 709/220 |
| 2004/0225915 | A1 * | 11/2004 | Johnson et al. ................. 714/13 |
| 2005/0210331 | A1 * | 9/2005 | Connelly et al. ............... 714/26 |
| 2006/0053216 | A1 * | 3/2006 | Deokar et al. ................ 709/223 |
| 2006/0259525 | A1 * | 11/2006 | Bae et al. ...................... 707/202 |

OTHER PUBLICATIONS

T. Li et al.; Cisco Hot Standby Router Protocol (HSRP); Network Working Group; Request for Comments 2281; Mar. 1998; pp. 1-17.
Juniper Networks, Inc.; "Web I/O Acceleration: Technology Overview"; 2005; 7 pages.
DX Application Acceleration Platform; Installation and Administration Guide for DXOS Version 5.0; Revision 1.00; Juniper Networks, Inc.; Oct. 10, 2005; 414 pages.

* cited by examiner

*Primary Examiner* — Ranodhi Serrao
(74) *Attorney, Agent, or Firm* — Harrity & Harrity, LLP

(57) ABSTRACT

A system provides a set of services. The system includes nodes that are in communication with each other. The system segregates the services into at least first and second groups of services, assigns the first group of services to a first set of the nodes, and assigns the second group of services to a second set of nodes. The first set of nodes provides the first group of services, and the second set of nodes provides the second group of services.

26 Claims, 11 Drawing Sheets

NODE IDENTIFIER: 1
GROUP: GROUP 1
LIST OF SERVICES: LIST OF SERVICES FOR GROUP 1
PORT: 9500
POLL INTERVAL: 1 SECOND
SERVICE INTERVAL: 8 SECONDS

FAILOVER SCHEME WITH SERVICE-BASED SEGREGATION

BACKGROUND

1. Field of the Invention

Implementations described herein relate generally to data communication and, more particularly, to a failover scheme with service-based segregation.

2. Description of Related Art

Fault-tolerance is a property of a system in which the system continues to operate properly in the event of failure of some of its parts. Duplication can provide fault-tolerance by, for example, providing multiple identical instances of the same system component and switching to one of the remaining instances in case of a failure.

One existing fault-tolerant system includes a master device and a standby device. The master device provides all of the services for the fault-tolerant system. If the master fails, then the standby becomes the master and, thereafter, provides all of the services for the fault-tolerant system. The switchover from the failed master to the standby causes some disruption in all of the provided services.

SUMMARY

According to one aspect, a failover system may include a first cluster of nodes to provide a first group of services, where a node of the first cluster may be configured to function as a master for the first cluster and at least one other node of the first cluster may be configured to function as a standby for the first cluster. The system may also include a second cluster of nodes, connected to the first cluster of nodes, to provide a second group of services, where a node of the second cluster may be configured to function as a master for the second cluster and at least one other node of the second cluster may be configured to function as a standby for the second cluster. The first group of services and the second group of services may be selected from an entire set of services associated with the failover system.

According to another aspect, a method may include providing a set of nodes in a failover system that may provide services; segregating the services into at least first and second groups of services; forming the nodes into clusters, where each of the clusters is responsible for providing the services associated with the first group or the second group; providing, by one of the clusters, the first group of services; and providing, by a different one of the clusters, the second group of services.

According to a further aspect, a system may include a first cluster of nodes to support a first group of services, where a node of the first cluster may be configured to function as a master for the first cluster and at least one other node of the first cluster may be configured to function as a standby for the first cluster. The system may also include a second cluster of nodes in communication with the first cluster of nodes, where the second cluster may be configured to support a second group of services, and a node of the second cluster may be configured to function as a master for the second cluster and at least one other node of the second cluster may be configured to function as a standby for the second cluster. The first group of services and the second group of services may be segregated from an entire set of services associated with the system.

According to another aspect, a system for providing a number of services may include means for providing a number of nodes that are in communication with each other; means for segregating the services into at least first and second groups of services; means for assigning the first group of services to a first set of the nodes; means for assigning the second group of services to a second set of nodes; means for providing the first group of services by the first set of nodes; and means for providing the second group of services by the second set of nodes.

According to a further aspect, a system may include a first cluster of nodes to provide a first group of services, where a node of the first cluster may be configured to function as a master for the first cluster and at least one other node of the first cluster may be configured to function as a standby for the first cluster. The system may also include a second cluster of nodes, connected to the first cluster of nodes, to provide a second group of services, where a node of the second cluster may be configured to function as a master for the second cluster. The first group of services and the second group of services may be selected from an entire set of services associated with the system.

BRIEF DESCRIPTION OF THE DRAWINGS

The accompanying drawings, which are incorporated in and constitute a part of this specification, illustrate one or more embodiments consistent with the principles of the invention and, together with the description, explain the invention. In the drawings.

FIGS. 6-11 are diagrams illustrating an exemplary implementation.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Implementations described herein provide a technique for segregating services in a failover system, such that when a master device becomes inactive and a standby device takes over as the master, a subset of the services provided in the failover system may be minimally disrupted while another subset of the services provided in the failover system may continue to be provided uninterrupted.

Exemplary Network

Figure 1:
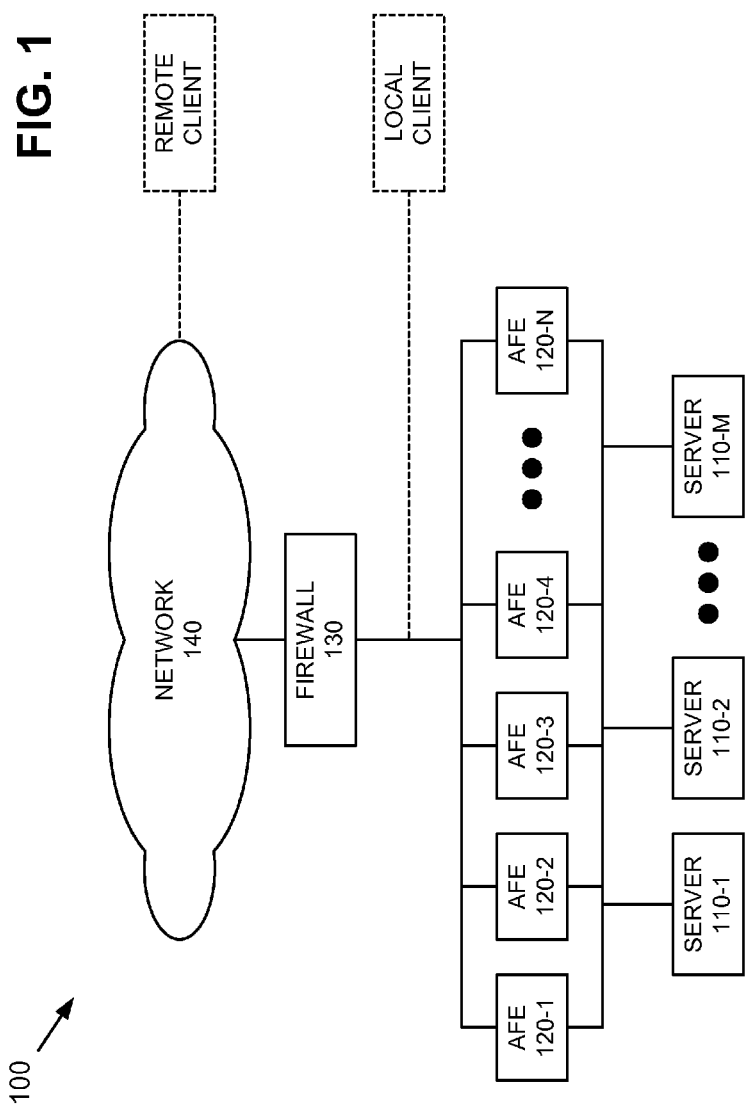
FIG. 1 is an exemplary diagram of a network in which systems and methods described herein may be implemented.

FIG. 1 is an exemplary diagram of a network 100 in which systems and methods described herein may be implemented. Network 100 may include servers 110-1, 110-2, ..., 110-M (where M≧1) (collectively referred to herein as "servers 110"), application front ends (AFEs) 120-1, 120-2, ..., 120-N (where N≧4) (collectively referred to herein as "AFEs 120"), firewall 130, and network 140. A particular number and arrangement of devices is shown in FIG. 1. In practice, there may be more or fewer devices or a different arrangement of devices. Further, while FIG. 1 shows servers 110, AFEs 120, and firewall 130 co-located, one or more of these devices may be remotely located.

Servers 110 may include devices that provide information and/or services to locally or remotely connected client devices. In one exemplary implementation, a server 110 may include a web server that serves web content and/or services. In another exemplary implementation, a server 110 may include a corporate server that hosts or manages content for a corporate network.

AFEs 120 may include devices (also called "nodes" herein) that operate as an interface for servers 110. For example, AFEs 120 may process requests for servers 110 and responses from servers 110. AFEs 120 may also provide various services to improve the operation of servers 110. For example, AFEs 120 may take over CPU-intensive tasks from servers 110. Other exemplary services that may be provided by AFEs 120 might include server load balancing, server monitoring, acceleration, scaling and high availability features, and/or global server load balancing. Server load balancing might include balancing the load on servers 110 (e.g., distributing the number of requests given to servers 110). Server monitoring might include periodic health checks on servers 110 to assure that a server 110 is functioning properly before sending a request to it. Acceleration might include techniques to provide efficient access to servers 110, such as multiplexing requests, compression, caching of server content, and/or keeping client connections alive. The scaling and high availability features might include techniques to enable AFEs 120 (or a subset of AFEs 120) to function as a single device. When servers 110 are remotely located, global server load balancing might permit client devices to connect to servers 110 best equipped to fulfill their requests, regardless of the location of servers 110.

AFEs 120 may operate as a failover system. For example, an AFE 120 may function as a master to provide one or more of the services and another one (or more) of AFEs 120 may function as a standby to possibly take over the services of the master, for example, in the event that the master becomes inactive (e.g., when the master fails).

In one implementation, the services may be segregated into groups and each group may be assigned to a cluster (e.g., group) of AFEs 120. An AFE may be a member of multiple clusters. Each cluster of AFEs 120 may include its own master and zero or more standby(s). The master for a particular cluster may provide all of the services in the group of services assigned to that cluster. In the event that the master becomes inactive, a standby in the cluster may take over and become the master for that cluster.

Firewall 130 may include hardware and/or software to thwart network attacks and prevent unauthorized access to servers 110. Network 140 may include a wide area network (WAN) (e.g., the Internet), a local area network, a telephone network (e.g., the Public Switched Telephone Network (PSTN)), an intranet, or a combination of networks. Communication among servers 110, AFEs 120, firewall 130, and network 140 may be accomplished via wired, wireless, and/or optical communication connections.

Exemplary AFE Configuration

Figure 2:
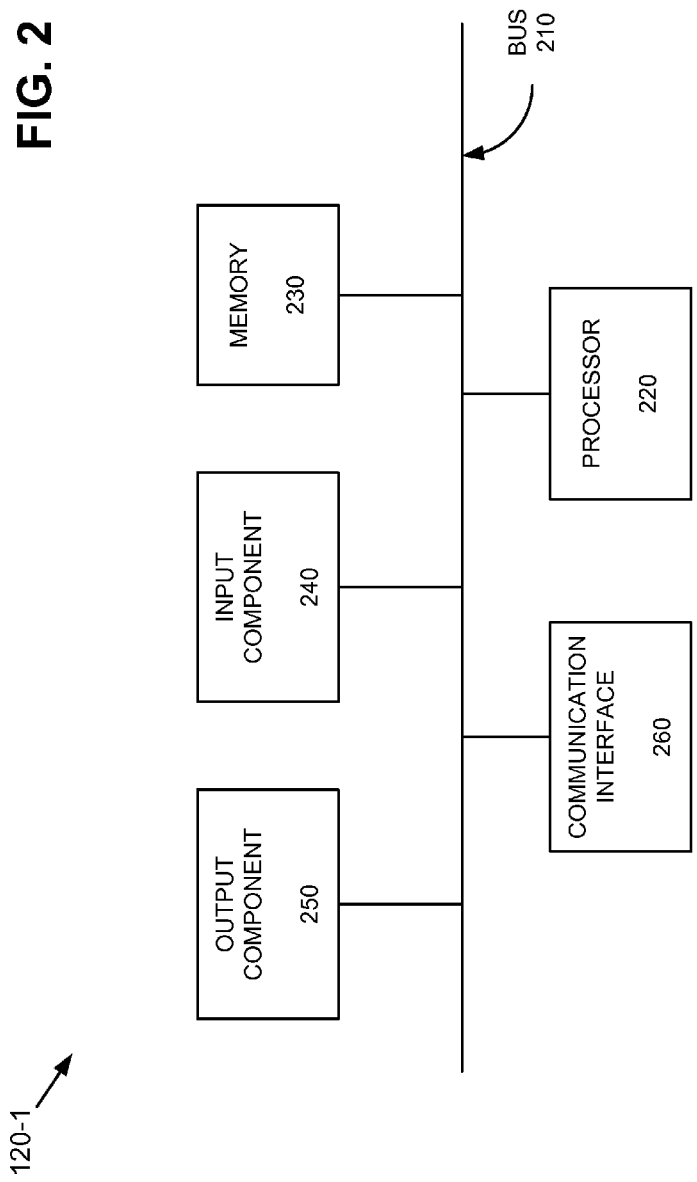
FIG. 2 is an exemplary block diagram of an application front end of FIG. 1.

FIG. 2 is an exemplary block diagram of AFE 120-1. AFEs 120-2, ..., 120-N may be similarly configured.

As shown in FIG. 2, AFE 120-1 may include a bus 210, a processor 220, a memory 230, an input component 240, an output component 250, and a communication interface 260. Bus 210 may include a path that permits communication among the elements of AFE 120-1.

Processor 220 may include a processor, microprocessor, or processing logic that may interpret and execute instructions. Memory 230 may include a random access memory (RAM) or another type of dynamic storage device that may store information and instructions for execution by processor 220; a read only memory (ROM) device or another type of static storage device that may store static information and instructions for use by processor 220; and/or a magnetic and/or optical recording medium and its corresponding drive.

Input component 240 may include a mechanism that permits an operator to input information to AFE 120-1, such as a web browser or command line interface, or a control button or switch. Output component 250 may include a mechanism that outputs information to the operator, such as an LED or some form of display. Communication interface 260 may include any transceiver-like mechanism that enables AFE 120-1 to communicate with other devices and/or systems.

AFE 120-1 may perform certain operations, as described in detail below. AFE 120-1 may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium or from another device via communication interface 260. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 3:
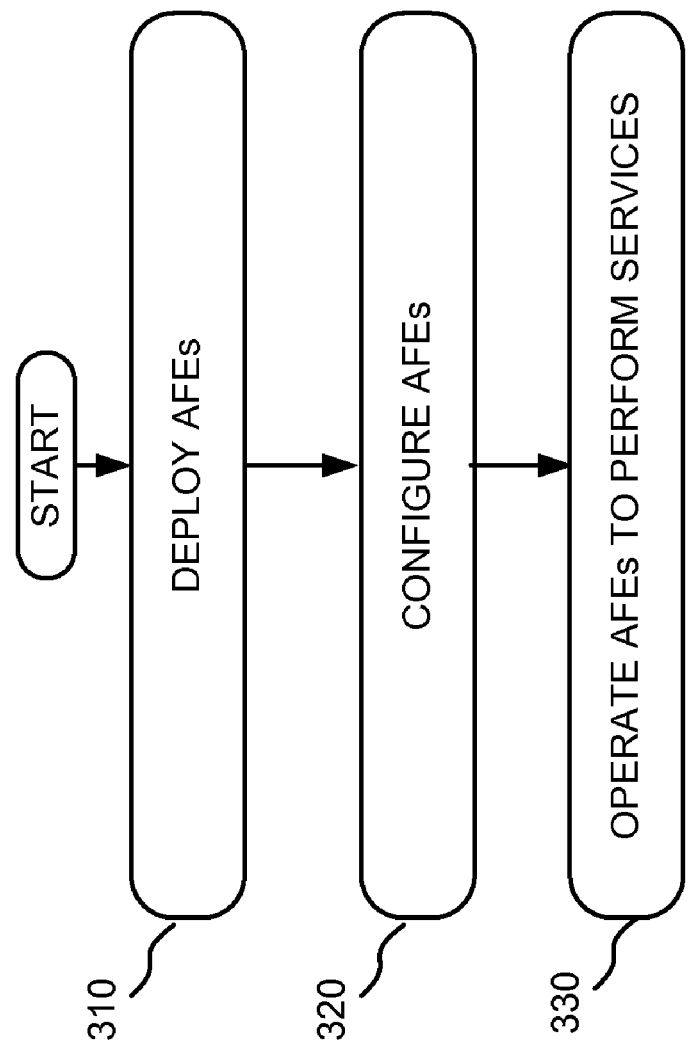
FIGS. 3-5 are flowcharts of exemplary processing for a failover system with service-based segregation.
Figure 4:
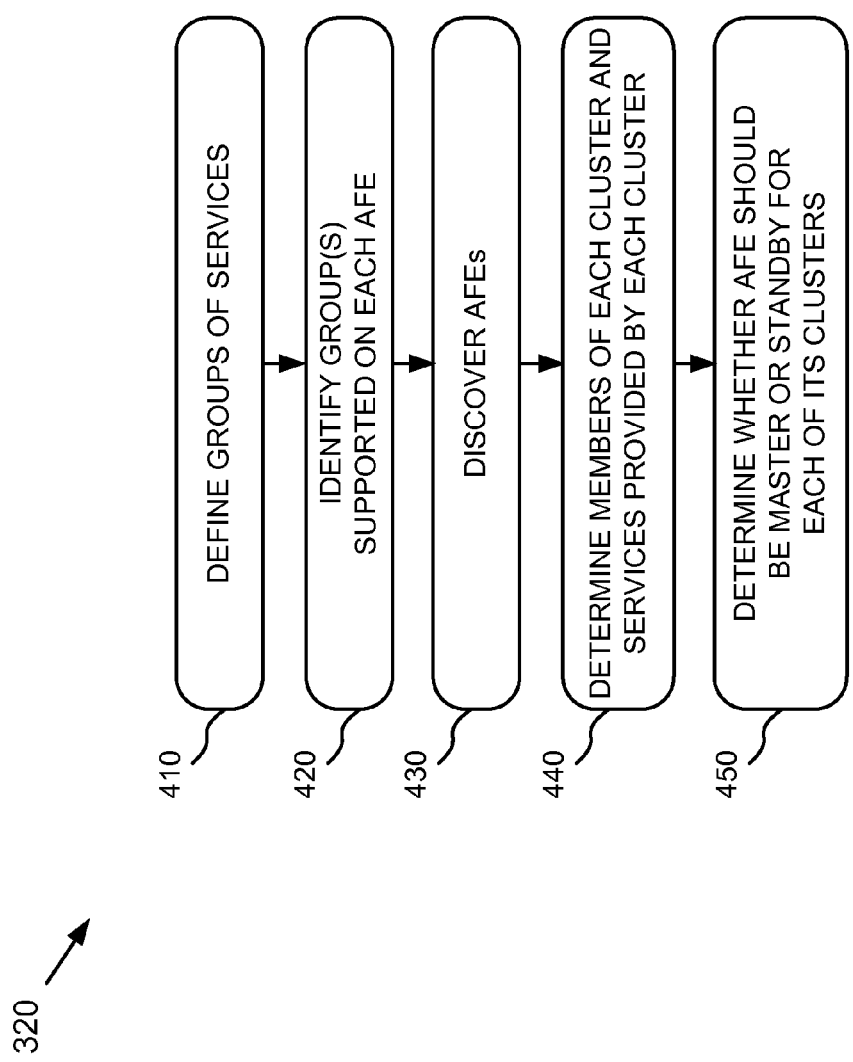
Figure 5:
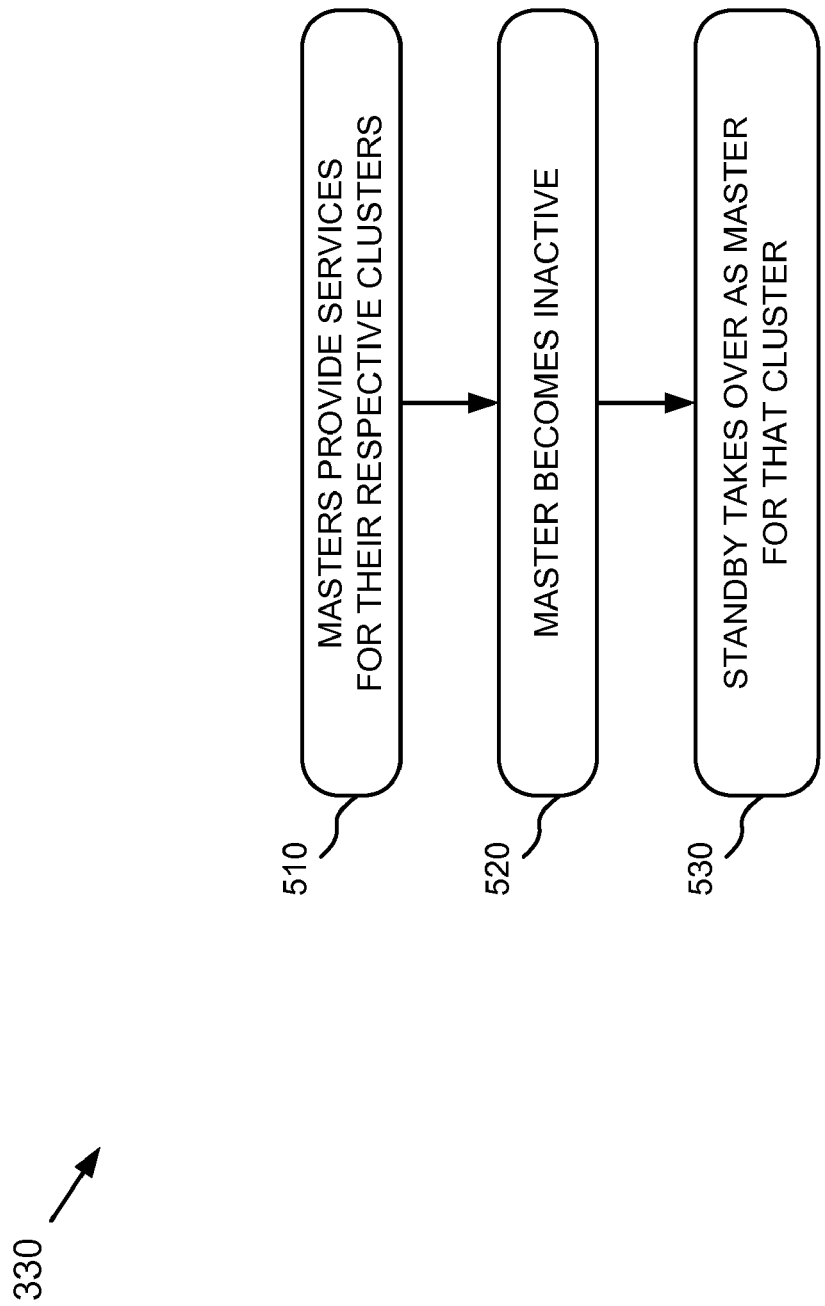

FIGS. 3-5 are flowcharts of exemplary processing for a failover system with service-based segregation. FIGS. 6-11 are diagrams illustrating an exemplary implementation.

Figure 6:
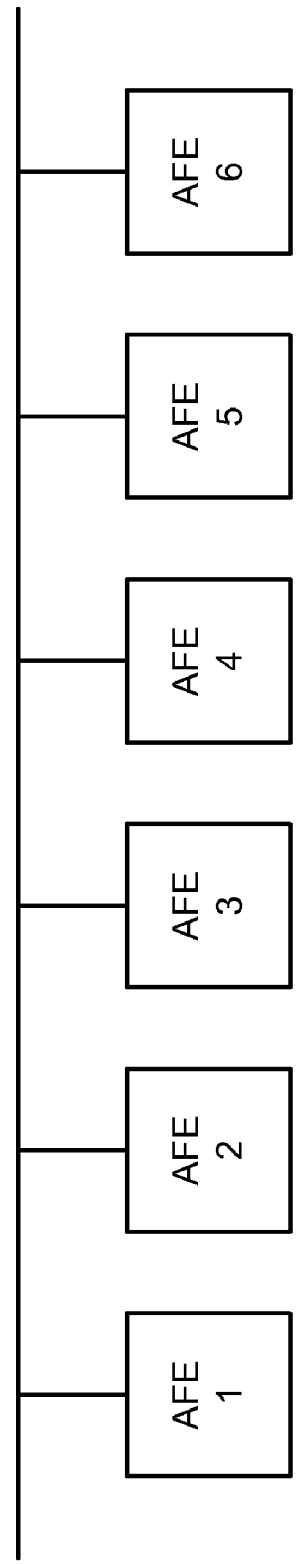

Processing may begin with the deployment of the AFEs (block 310) (FIG. 3). Deployment of the AFEs might include connecting each of the AFEs to the appropriate devices, such as other AFEs, servers, firewall, etc. Assume for the example to follow that six AFEs are deployed, as shown in FIG. 6.

The AFEs may be configured to operate according to a failover scheme (block 320). For example, the AFEs may be formed into clusters and each of the clusters may operate to provide a group of services according to a failover scheme.

FIG. 4 is a flowchart of exemplary processing for configuring the AFEs. The services to be performed by the AFEs may be segregated into groups (block 410). A group of services may include a list of one or more services. Multiple groups may be formed. The list of services in each group may be exclusive. In other words, if one group includes a particular service, then no other group may include that service. The segregation of services into groups can be performed on a runtime basis. In one implementation, the segregation may be performed by a network administrator using, for example, a web browser or command line interface.

Figure 7:
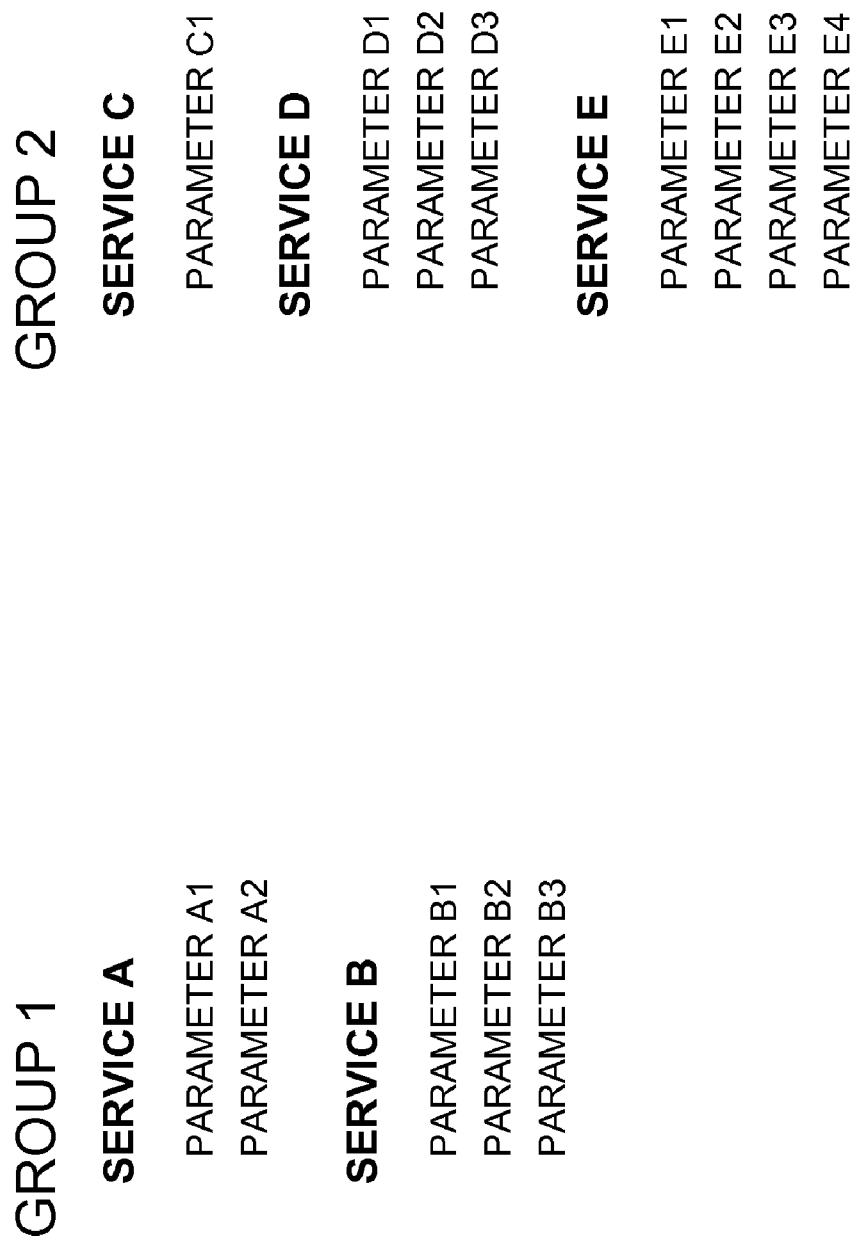

As shown in FIG. 7, assume that the list of available services (e.g., services A-E) are segregated into two groups (e.g., Group 1 and Group 2). Assume that Group 1 includes services A and B, and Group 2 includes services C, D, and E. Each of services A-E may have one or more associated parameters. As shown in FIG. 7, service A may include parameters A1 and A2; service B may include parameters B1, B2, and B3; service C may include parameter C1; service D may include parameters D1, D2, and D3; and service E may include parameters E1, E2, E3, and E4.

Figure 8:
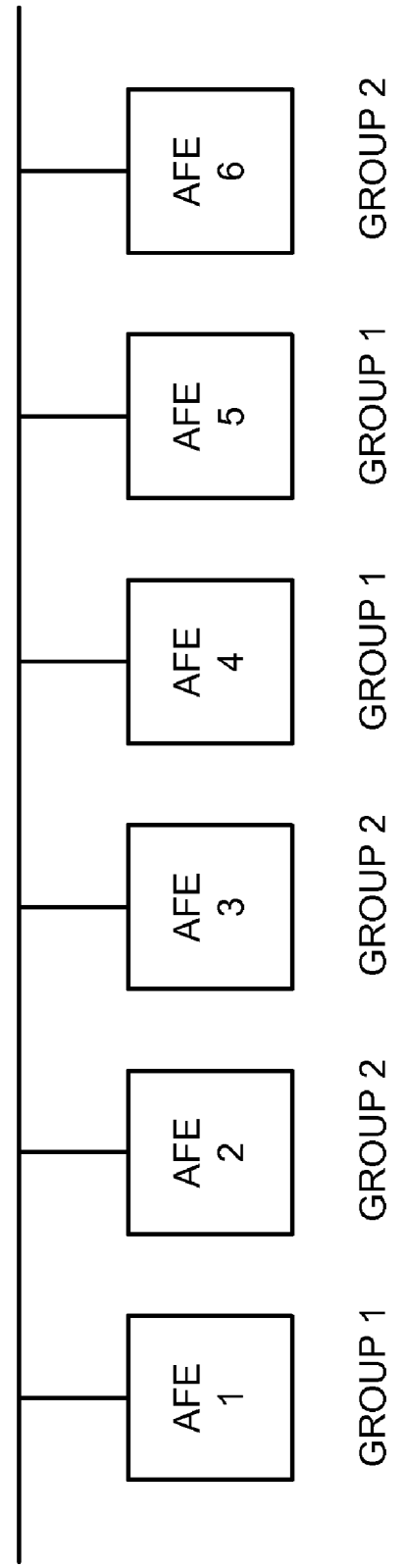

Returning to FIG. 4, the group, or groups, of services supported on each AFE may be identified (block 420). For example, one or more groups of services may be assigned to each AFE. As shown in FIG. 8, assume that AFE 1, AFE 4, and AFE 5 are assigned to support the services associated with Group 1, and AFE 2, AFE 3, and AFE 6 are assigned to support the services associated with Group 2. The group of services with which an AFE is associated may be stored within the AFE. For example, AFE 1 may store the name of the group of services assigned to AFE 1 (e.g., Group 1) and the list of services associated with the group (e.g., service A and service B).

Returning to FIG. 4, the AFEs may discover each other (block 430). For example, the AFEs may broadcast data to dynamically discover other AFEs that connect to the same local network, possibly irrespective of the groups assigned to the AFEs. In one implementation, an AFE may broadcast data to a predetermined port. The data may, for example, take the form of a discovery message and identify the AFE from which the discovery message originated. The other AFEs in the same local network may continuously or periodically monitor data received at the predetermined port. When an AFE receives the broadcast data at the predetermined port, the AFE may send data, such as a response, back to the AFE that broadcast the discovery message. A list of AFEs may be generated based on the discovered AFEs. For example, an AFE may, as or after it discovers new AFEs, add the AFEs to a list of AFEs. In one implementation, each AFE may include an associated node identifier that uniquely identifies the AFE. The list of AFEs may include a list of node identifiers.

The AFEs may exchange information to determine members of each cluster and the services provided by each cluster (block 440). In one implementation, an AFE may transmit information 900 to the other AFEs that identifies, for example, the group of services supported by the AFE. As shown in FIG. 9, information 900 may include a node identifier, group data, list of services data, port data, poll interval data, and/or service interval data. In another implementation, information 900 may include more, fewer, or different types of data.

The node identifier may uniquely identify the AFE that transmitted the information (e.g., AFE 1). If an AFE detects that its node identifier conflicts with the node identifier of another AFE, then the AFE may change its node identifier so that it is unique. The group data may identify the name of the group of services supported by the AFE (e.g., Group 1). The list of services data may identify the list of services associated with the group (e.g., the list of services for Group 1). The port data may identify the port on which the AFE will listen for communication from other AFEs in its cluster (e.g., 9500). The poll interval data may identify the polling interval at which it will verify the availability of other AFEs in its cluster (e.g., every 1 second). The service interval data may identify the interval at which a failed service may be monitored (e.g., every 8 seconds).

Figure 10:
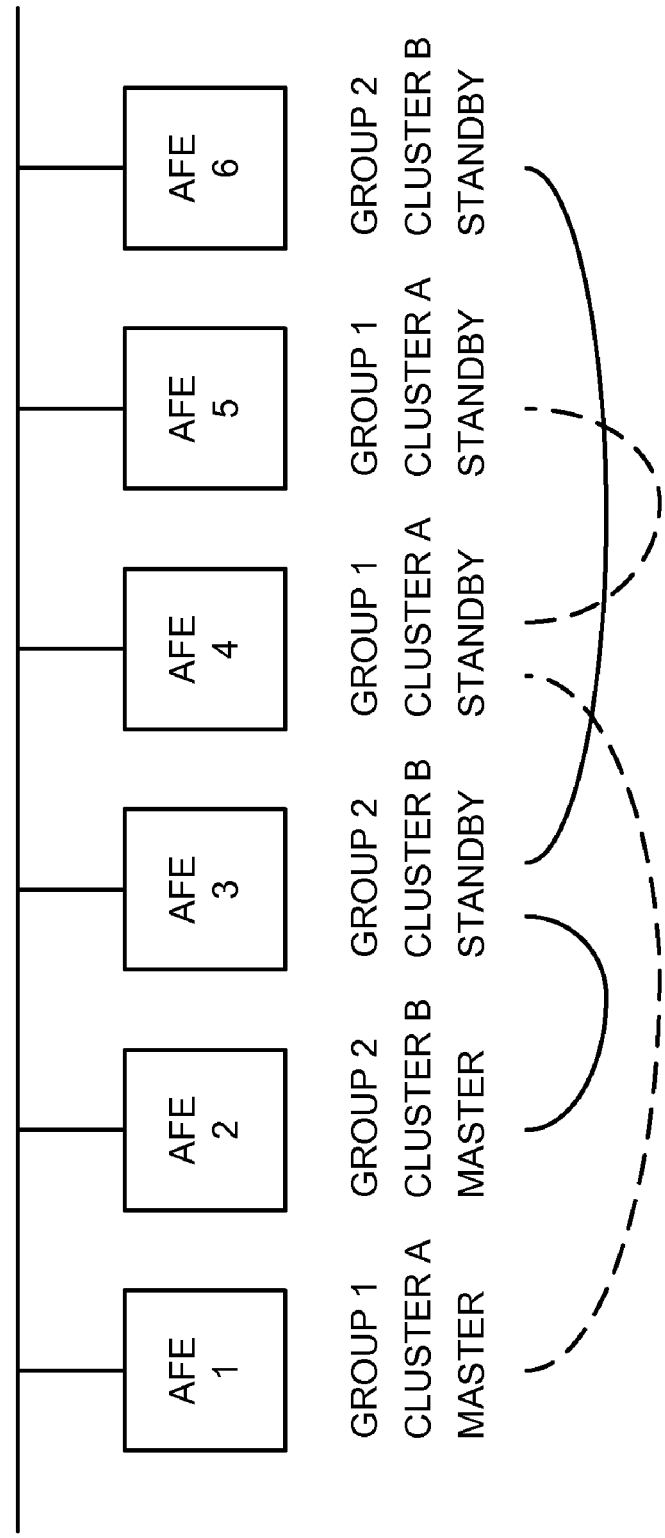

When an AFE receives information from another AFE, the AFE may check the group data and process the information if the group data identifies the same group of services that is supported by the AFE. For example, if the information shown in FIG. 9 is received by an AFE, the AFE will process the information if the AFE also supports Group 1 and ignore the information if the AFE does not support Group 1. In one implementation, the AFE may use the information to identify, and possibly record, the other AFEs in the same cluster (i.e., the AFEs supporting the same group of services). As a result of the information exchange, the AFEs may be formed into clusters, where each of the clusters supports one or more groups of services. As shown in FIG. 10, AFE 1, AFE 4, and AFE 5 support Group 1 and are nodes of cluster A, and AFE 2, AFE 3, and AFE 6 support Group 2 and are nodes of cluster B.

Once the clusters are formed, the AFEs in a cluster may exchange information to determine whether an AFE should function as a master or a standby for each of its clusters (block 450). The AFEs may use any technique to determine the master and standby(s). For example, a simple technique might identify the AFE with the lowest node identifier as the master for that cluster. As shown in FIG. 10, AFE 1 may be determined as the master of cluster A, and AFE 4 and AFE 5 may be determined as standbys for cluster A. As further shown in FIG. 10, AFE 2 may be determined as the master of cluster B, and AFE 3 and AFE 6 may be determined as standbys for cluster B.

Returning to FIG. 3, the AFEs may operate to perform their respective services (block 330). For example, the AFEs may operate according to a failover scheme with service-based segregation.

FIG. 5 is a flowchart of exemplary processing for providing services. The master AFEs may provide services for their respective clusters (block 510). As explained above, each of the clusters may be associated with one or more groups of services. The AFEs in a cluster may operate together to provide the services in the one or more groups of services associated with that cluster. In one implementation, the master in a particular cluster may provide all of the services for that cluster. The standby(s) for the cluster may act as a back up for the master in the cluster.

At some point, a master may become inactive (block 520). A master might become inactive for any number of reasons. For example, an error in a service provided by the master might cause the master to become inactive. Alternatively, a hardware and/or software fault might occur within the master and cause the master to become inactive. The AFEs within a cluster periodically exchange information (e.g., health pings) to determine the health of the other AFEs in the cluster. This periodic exchange may facilitate a determination that the master has become inactive.

Figure 11:
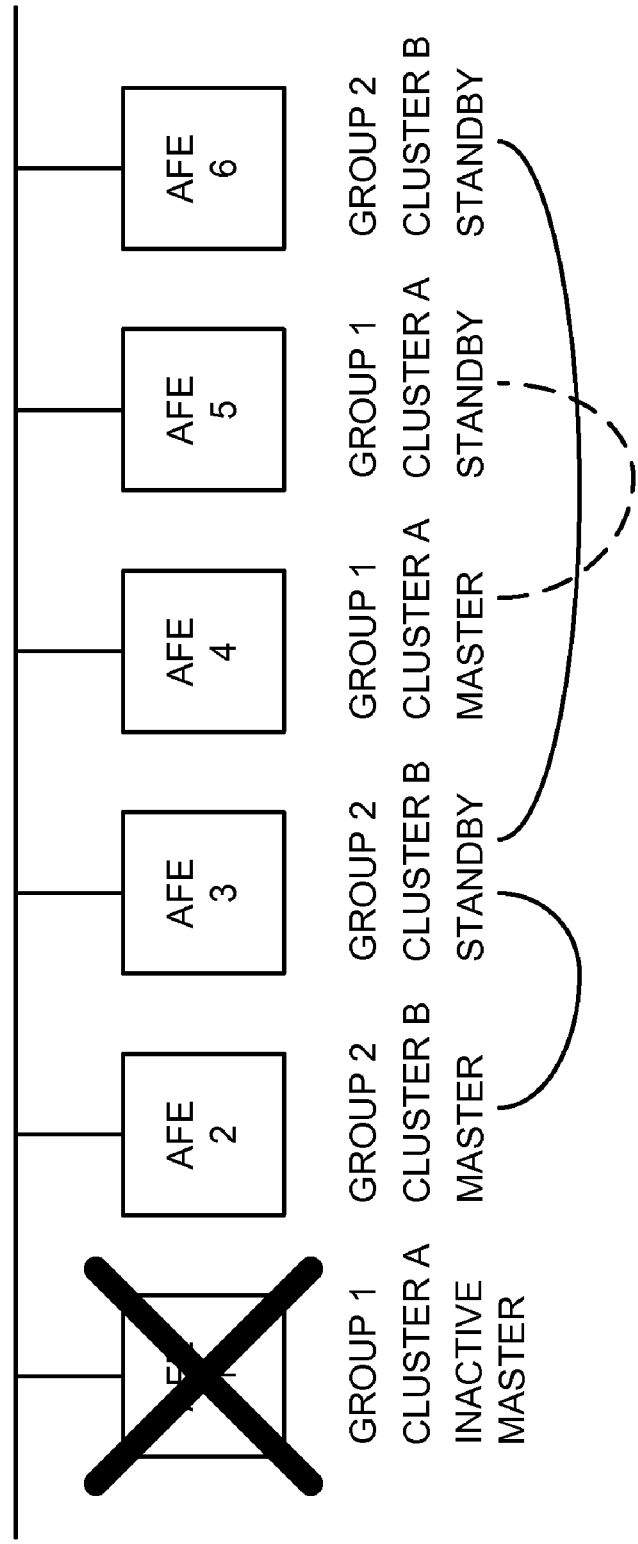

When the master becomes inactive, a standby may take over as the master for the cluster (block 530). The particular standby that takes over for the inactive master may be determined in various ways. For example, a simple technique might identify the standby AFE with the lowest node identifier as the new master for that cluster. As shown in FIG. 11, AFE 4 may be determined as the new master of cluster A, and AFE 5 may remain as a standby for cluster A. Minimal disruption in the services provided by cluster A may be caused (e.g., seconds or milliseconds) while the standby takes over as the master. There would be no disruption in the services provided by cluster B.

The service-based segregation described above has several advantages. One advantage is that the service-based segregation may improve performance of the failover system. For example, the processing load is distributed over multiple devices (e.g., AFEs) and not centered on a single device. In other words, each of multiple AFEs may perform a subset of the services provided by the failover system, thereby improving the performance of the failover system.

Another advantage is that the service-based segregation may improve customer support. For example, the responsibility for the services is distributed over multiple devices (e.g., AFEs) instead of a single device. If there is a problem relating to a particular service, the service may be operated upon without affecting all of the other services. By segregating, the problem service may be isolated (e.g., put in its own group) and worked upon in isolation. All other services may then be provided uninterrupted. This may also be beneficial when adding a new service. For example, the new service may be put in its own group to verify that the service operates properly in isolation before adding the service to another group with other services.

Yet another advantage is that the service-based segregation may improve product upgrades. For example, during a product upgrade, a master device may be updated with a new revision. This may require that the master become inactive during the upgrade. Because the responsibility for the services is distributed over multiple devices (e.g., AFEs) and not centered on a single device, the disruption in services may be diluted. For example, one master may be upgraded at a time, thereby causing a disruption in a single set of services at a time (instead of all of the services in the case where a single device is responsible for all of the services).

Other advantages may also be evident to one skilled in the art.

CONCLUSION

Implementations described herein may provide service-based segregation in a failover system, such that when a master device becomes inactive and a standby device takes over as the master, a subset of the services provided in the failover system may be minimally disrupted while another subset of the services provided in the failover system may continue uninterrupted.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 3-5, the order of the acts may differ in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

Also, it has been described that a standby can take over processing for a master in the event that the master becomes inactive (e.g., when the master fails). In an alternative implementation, a standby can be configured to take over processing for a master in a situation other than the inactivity of the master.

Further, the terms "group" and "cluster" are intended to be synonymous in that a group of services may be associated with a particular cluster of AFEs. An AFE may be assigned a particular group of services and, therefore, be a member of the cluster associated with that group of services. Similarly, an AFE may be assigned multiple groups of services and, therefore, be a member of multiple clusters. It is possible for the AFE to function as a master for one of its clusters and a standby for another one of its clusters.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A failover system, comprising:
a first cluster of nodes to provide a first group of services, nodes of the first cluster of nodes being implemented at least partially in hardware, a node, of the first cluster of nodes, to function as a master for the first cluster of nodes and at least one other node, of the first cluster of nodes, to function as a standby for the first cluster of nodes; and
a second cluster of nodes, connected to the first cluster of nodes, to provide a second group of services, nodes of the second cluster of nodes being implemented at least partially in hardware, a node, of the second cluster of nodes, to function as a master for the second cluster of nodes and at least one other node, of the second cluster of nodes, to function as a standby for the second cluster of nodes,
the nodes of the first cluster of nodes and the nodes of the second cluster of nodes to exchange information,
at least one node of the first cluster of nodes to:
process the information received from other nodes of the first cluster of nodes,
determine, based on the information received from the nodes of the second cluster of nodes, that the nodes of the second cluster of nodes do not provide the first group of services, and
disregard the information received from the nodes of the second cluster of nodes, based on determining that the nodes of the second cluster of nodes do not provide the first group of services,
the first group of services and the second group of services being selected from an entire set of services associated with the failover system,
the first group of services including a first list of services and the second group of services including a second list of services,
the first list of services being exclusive relative to the second list of services,
the master for the first cluster of nodes providing the first group of services without providing the second group of services, and
the master for the second cluster of nodes providing the second group of services without providing the first group of services.

2. The system of claim 1, the entire set of services associated with the failover system being segregated into the first group of services, the second group of services, and a third group of services, services in the third of group of services being different than the first list of services and the second list of services,
the first group of services being assigned to the first cluster of nodes, and
the second group of services being assigned to the second cluster of nodes,
the third group of services being assigned to a third cluster of nodes.

3. The system of claim 1, one of the nodes of the first cluster of nodes to discover other ones of the nodes of the first cluster of nodes and the nodes of the second cluster of nodes.

4. The system of claim 3, the one of the nodes of the first cluster of nodes to broadcast data to dynamically discover the other nodes of the first cluster of nodes and the nodes of the second cluster of nodes.

5. The system of claim 4, the one of the nodes of the first cluster of nodes to broadcast the data to a particular port of each of the other nodes of the first cluster of nodes and the nodes of the second cluster of nodes.

6. The system of claim 3, the one of the nodes of the first cluster of nodes to:
receive data from the other nodes of the first cluster of nodes and the nodes of the second cluster of nodes, and
generate a list that identifies the other nodes of the first cluster of nodes and the nodes of the second cluster of nodes.

7. The system of claim 1, the exchanged information respectively including information regarding the first group of services provided by the nodes of the first cluster of nodes and the second group of services provided by the nodes of the second cluster of nodes.

8. The system of claim 7, one of the nodes of the first cluster of nodes to identify other ones of the nodes in the first cluster of nodes as part of the first cluster of nodes based on the exchanged information.

9. The system of claim 1, the nodes of the first cluster of nodes to identify the node to function as the master and the at least one other node to function as the standby.

10. The system of claim 1, the master for the first cluster of nodes to provide the first group of services for the first cluster of nodes when the master for the first cluster is active, and
the standby of the first cluster of nodes to provide the first group of services when the master of the first cluster of nodes is inactive.

11. The system of claim 1, the master for the first cluster of nodes to provide the first group of services for the first cluster of nodes when the master for the first cluster of nodes is active,
the standby of the first cluster of nodes to provide the first group of services for the first cluster of nodes when the master of the first cluster of nodes becomes inactive.

12. The system of claim 11, the master of the second cluster of nodes to provide the second group of services for the second cluster of nodes independent of the master of the first cluster of nodes becoming inactive.

13. A method, comprising:
configuring a plurality of nodes in a failover system, the plurality of nodes providing a plurality of services;
segregating the plurality of services into at least a first group of services and a second groups of services;
forming clusters of nodes based on the plurality of nodes, each of the clusters of nodes providing services associated with the first group of services or the second group of services;
providing, by one of the clusters of nodes, the first group of services,
nodes of the one of the clusters of nodes being implemented at least partially in hardware, a node, of the one of the cluster of nodes, functioning as a master for the one of the cluster of nodes;
providing, by a different one of the clusters of nodes, the second group of services,
nodes of the different one of the clusters of nodes being implemented at least partially in hardware, a node, of the different one of the cluster of nodes, functioning as a master for the different one of the clusters of nodes, and
the nodes of the one of the clusters of nodes and the nodes of the different one of the clusters of nodes to exchange information;
processing, by at least one node of the one of the cluster of nodes, the information received from other nodes of the first cluster of nodes; and
ignoring, by the at least one node, the information received from one or more nodes of the different one of the cluster of nodes, based on the information, received from the one or more nodes, indicating that the one or more nodes do not provide the first group of services,
the first group of services including a first list of services and the second group of services including a second list of services,
the first list of services being exclusive relative to the second list of services,
the master for the one of the clusters of nodes providing the first group of services without providing the second group of services, and
the master for the different one of the clusters of nodes providing the second group of services without providing the first group of services.

14. The method of claim 13, further comprising:
identifying, for each of the clusters of nodes, one of the nodes of the cluster of nodes to function as a master for the cluster of nodes and at least one other one of the nodes of the cluster of nodes to function as a standby for the cluster of nodes.

15. The method of claim 14, further comprising:
detecting that the master of the one of the clusters of nodes, providing the first group of services, becomes inactive; and
providing, by a standby of the one of the clusters, the first group of services when the master becomes inactive.

16. The method of claim 15, further comprising:
providing, by the master of the different one of the clusters of nodes, the second group of services prior to the master of the one of the clusters of nodes becoming inactive and after the master of the one of the clusters of nodes becomes inactive.

17. The method of claim 13, further comprising:
discovering, by at least one node of the clusters of nodes, other nodes of each of the clusters of nodes.

18. The method of claim 17, where discovering the other nodes includes broadcasting, by the at least one of the nodes, data to dynamically discover the other nodes.

19. The method of claim 18, where broadcasting the data includes broadcasting the data to a particular port of the other nodes.

20. The method of claim 17, where discovering the other nodes includes:
receiving data from the other nodes; and
generating a list that identifies the other nodes independent of a respective one of the clusters of nodes with which the other nodes are associated.

21. The method of claim 13, where forming the clusters of nodes includes exchanging information regarding services provided by each node of the clusters of nodes.

22. The method of claim 21, where forming the clusters of nodes further includes identifying, by at least one node of each cluster of nodes of the clusters of nodes, other nodes in the cluster of node as being part of the cluster of nodes based on the exchanged information.

23. A system, comprising:
a first cluster of nodes to provide a first group of services, a node of the first cluster of nodes to function as a master for the first cluster of nodes and at least one other node of the first cluster of nodes to function as a standby for the first cluster of nodes;
a second cluster of nodes, connected to the first cluster of nodes, to provide a second group of services, a node of the second cluster of nodes to function as a master for the second cluster of nodes,
nodes of the first cluster of nodes and nodes of the second cluster of nodes being implemented at least partially in hardware,
nodes of the first cluster of nodes and nodes of the second cluster of nodes to exchange information; and
one or more nodes of the first cluster of nodes to:
  process the information received from other nodes of the first cluster of nodes, and
  disregard the information received from the nodes of the second cluster of nodes, based on the information, received from the nodes of the second cluster of nodes, indicating that the nodes of the second cluster of nodes do not provide the first group of services,
the first group of services and the second group of services being selected from an entire set of services associated with the system,
the first group of services, provided by the first cluster of nodes, being different than the second group of services, provided by the second cluster of nodes,
  the master for the first cluster of nodes providing the first group of services without providing the second group of services, and
  the master for the second cluster of nodes providing the second group of services without providing the first group of services.

24. The system of claim 23, where the node, of the first cluster of nodes, is to receive information, from the at least one other node of the first cluster of nodes, indicating that the at least one other node provides the first group of services, and
  where the node and the at least one other node are included in the first cluster of nodes based on the information received from the at least one other node.

25. The system of claim 23, where the node, of the second cluster of nodes, is to:
  broadcast data to discover one or more additional nodes included in the second cluster of nodes,
  receive, in response to the broadcast data, information from another node, the received information identifying the other node as providing the second group of services, and
  determine that the other node is included in the second cluster based on the received information from the other node.

26. The system of claim 23, where the master for the second cluster of nodes provides the second group of services prior to the master for the first cluster of nodes becoming inactive and after the master for the first cluster of nodes becoming inactive.

* * * * *

UNITED STATES PATENT AND TRADEMARK OFFICE
CERTIFICATE OF CORRECTION

PATENT NO.        : 8,209,405 B1
APPLICATION NO.   : 11/423566
DATED             : June 26, 2012
INVENTOR(S)       : Atul N. Trivedi It is certified that error appears in the above-identified patent and that said Letters Patent is hereby corrected as shown below:

Claim 22, column 10, line 66 should read: "the cluster of nodes as being part of the cluster of nodes based"

Signed and Sealed this
Twenty-eighth Day of August, 2012

David J. Kappos
*Director of the United States Patent and Trademark Office*